US007555546B1

(12) United States Patent
Anumala

(10) Patent No.: US 7,555,546 B1
(45) Date of Patent: Jun. 30, 2009

(54) ENTERPRISE NETWORK SERVICES ARCHITECTURE

(75) Inventor: Mohnish Anumala, Littleton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 947 days.

(21) Appl. No.: 10/670,932

(22) Filed: Sep. 25, 2003

(51) Int. Cl.
G06F 15/173 (2006.01)
G06F 13/00 (2006.01)

(52) U.S. Cl. .................. 709/224; 709/223; 709/222; 709/219; 709/239; 370/252; 370/241; 714/39; 714/47; 340/825; 340/825.98

(58) Field of Classification Search ......... 709/217–224, 709/227, 239
See application file for complete search history.

(56) References Cited

U.S. PATENT DOCUMENTS

| 6,681,232 | B1* | 1/2004 | Sistanizadeh et al. .... 707/104.1 |
| 2002/0114281 | A1* | 8/2002 | Rosu et al. .................. 370/238 |
| 2003/0133554 | A1* | 7/2003 | Nykanen et al. ....... 379/201.01 |
| 2004/0179481 | A1* | 9/2004 | Graupner .................... 370/254 |

* cited by examiner

Primary Examiner—Jude J Jean Gilles
(74) Attorney, Agent, or Firm—David A. Dagg

(57) ABSTRACT

An enterprise network services architecture providing an interface to enterprise application programs, that enables enterprise application programs to define end to end network service parameters on an application specific basis, across multiple forwarding domains within the enterprise network. Communication service parameters defined by the application are enforced by software programs, referred to as network services modules (NSMs), operating on a per-forwarding domain basis. A network services protocol (NSP) provides communications between application servers and the NSMs, and a network services exchange protocol (NSEP) is used for communications between the NSMs. The disclosed NSMs enforce quality of service (QoS) levels within forwarding domains as needed to support end to end communication service parameters defined by enterprise applications. NSM operation includes, but is not limited to, control of path selection on a per-forwarding domain basis, as needed to support the communication service definitions of enterprise application programs. Authentication by application servers of application service requests provides authentication prior to establishment of communication services requested by the enterprise applications.

25 Claims, 5 Drawing Sheets

ENTERPRISE NETWORK SERVICES ARCHITECTURE

FIELD OF THE INVENTION

The present invention relates generally to supporting the communication needs of enterprise application computer programs, and more specifically to an enterprise network services architecture.

BACKGROUND OF THE INVENTION

Most business enterprises today depend on an enterprise communication network ("enterprise network") for successful day to day operation. In this context, an enterprise network may be defined as any communications network under the control of a single organization. Enterprise networks often include geographically dispersed networking devices and other resources. An enterprise network may use multiple, varied networking protocols, employ different types of forwarding devices, connect computer systems from different vendors, and be relied on by numerous enterprise level application programs.

With the globalization of the economy, enterprise networks are increasingly used to interconnect sites in multiple geographic locations. For example, enterprise networks may employ a number of internal data and voice networks to provide connectivity within sites, and interconnect those sites by way of the Internet or leased lines. The organization may obtain service level agreements (SLAs) with one or more Internet/leased-line connectivity providers for its inter-site communication needs. At the present time, such SLAs mainly consist of agreements on the amount of bandwidth to be provided between specific sites, and network uptime requirements. Enterprise networks often include diverse types of communication networks, portions of which use different protocols for data forwarding. For example, a portion of an enterprise network may operate using switching forwarding devices, while another portion may operate using routing forwarding devices, etc. Such portions of the enterprise network are referred to herein as "forwarding domains".

Today's enterprise networks are used by an ever widening variety of software and hardware applications. Each business uses a set of applications that uniquely fits its particular needs. Enterprise applications require connectivity over the enterprise network, in order to operate properly and to offer application services to users throughout the enterprise. To provide enterprise-wide application connectivity, many different network types and interfaces are used, such as Ethernet, POS (Packet over SONET), ATM (Asynchronous Transfer Mode), and/or many others. Using these varied systems, enterprise network performance has steadily improved in terms of providing connectivity within the enterprise. However, enterprise wide connectivity in itself is insufficient to completely meet the needs of many enterprise applications. Unfortunately, from the perspective of today's enterprise application computer programs, existing enterprise networks simply connect end points within the enterprise so that the application can run. Applications relying on the enterprise network often have no convenient control over the operation of the network in terms of how the enterprise network treats application data packets on an end to end basis across the enterprise. Under these circumstances, enterprise applications can only rely on the enterprise network to provide basic end to end connectivity, without the ability to specify other aspects of the service they receive from the enterprise network.

Network service requirements of individual enterprise applications can be quite different. One enterprise application might require a relatively small end to end delay, and continue to operate properly in the face of some percentage of packet loss (e.g. Voice over IP), while another enterprise application might need a constantly fixed bandwidth between connected components. In terms of prioritization of resource allocation, one application might be highly significant from the overall enterprise perspective, while another application is not. For example, a high priority application might provide critical financial transfers between client accounts, while a lower priority application might provide relatively unimportant file downloads for employees sharing the same network.

In existing systems, DiffServ (DIFFerentiated SERVices) attempts to address this problem. DiffServ is a method for adding quality of service (QoS) to IP networks. Operating at layer 3 of the OSI (Open System Interconnection) model, DiffServ uses the IP Type of Service (ToS) field as the DiffServ byte (DS byte). DiffServ, as well as other existing systems using VLAN-tag (Virtual Local Area Network-tag) priority bits in the packet header, provide some packet prioritization, as well as some definition of delay requirements. However, these systems have significant drawbacks. For example, in the case where a wireless voice application runs on a wireless phone or wireless PDA (Personal Digital Assistant), voice data received from the wireless device is packetized and transmitted over a data network to a destination end station, such as another wireless device. Depending on the loss and delay between the communicating end stations, the wireless voice application may run successfully or fail. However, the wireless voice application can't do anything to control the end to end loss or delay across the enterprise network, other than setting DiffServ bits in the data packets (assuming they are IP packets). DiffServ can't address end-point to end-point service requirements, since internetworking devices typically do not consider DiffServ settings when they make path determinations. For example, a wireless device or enterprise application can't use DiffServ to require the network to offer 20 mSec delay with a 10% acceptable packet loss rate. Accordingly, there is nothing to prevent the enterprise network from operating such that packets are re-routed to avoid a dynamically detected point of network congestion causing an 8% packet loss, even when the delay resulting from the re-routing increases the overall end to end delay to 40 mSec. Thus re-routing of data may occur even if it is detrimental to the wireless application. Such problems result at least in part from the fact that internetworking devices such as routers and/or switches do not make path determinations based on the value of the DiffServ bits.

Existing enterprise networks are generally designed to transfer packets from point A to point B within the enterprise without taking into consideration enterprise application service needs. Accordingly, a forwarding device might not define different queuing or networking paths for two different packet flows with different requirements, but destined for the same end station or subnet. QoS is typically supported on a forwarding domain basis. While it may be convenient on a platform architecture basis to support QoS within a single forwarding domain, it doesn't enable the end-to-end service definition capabilities needed by enterprise applications.

An example of an existing communication protocol providing bandwidth reservation is RSVP-TE (ReSerVation Protocol with Traffic Engineering). RSVP is a communications protocol that signals a router to reserve bandwidth for real-time transmission. RSVP-TE creates traffic engineered paths that solve bandwidth related issues. However, currently, RSVP-TE requires expensive routers and does not span across forwarding domains. Accordingly, RSVP-TE also does not enable enterprise application programs to define end point to end point service requirements. Moreover, even if networks are deployed with costly RSVP-TE routers, RSVP doesn't offer certain services at a network level because RSVP itself is run at an individual internetworking platform level.

An example of an existing communication protocol for providing communication services using the Internet as a backbone network is MPLS (MultiProtocol Label Switching). MPLS enables routing of packets over the Internet. MPLS uses labels, or tags, containing forwarding information, that are attached to IP packets by a router sitting at the edge of the MPLS forwarding domain, known as a label edge router (LER). Generally speaking, LERs perform packet analysis and classification before the packet enters the core of the MPLS network. Routers within the MPLS forwarding domain core, known as label switch routers (LSRs), examine the added label and forward the packet. MPLS can ensure that all packets in a particular flow take the same route over an MPLS forwarding domain. However, since MPLS operation is enabled by LERs, it does not provide an application program specific control interface that would enable enterprise application programs to control parameters necessary to appropriately support their operation across forwarding domains within an enterprise network. Moreover, MPLS itself does not conveniently support dynamic route control, and cannot easily provide the scalability necessary for enterprise networks, which must be designed to grow conveniently in terms of adding devices and applications.

The above discussion describes some of the shortcomings of existing enterprise data networks with regard to supporting enterprise application programs. Enterprise application programs do not receive independent network related service guarantees from the enterprise network, other than end to end connectivity. Many existing enterprise applications are non-real-time data applications. However, as converged data and voice networks emerge, and the next generation of data applications put more requirements on enterprise networks, there is a growing need for a new system that can meet the specific needs of enterprise applications with respect to application specific service definitions provided on an end to end basis across the entire underlying enterprise network.

SUMMARY OF THE INVENTION

To address the shortcomings of existing systems, an enterprise network services architecture is disclosed that provides a network service interface to enterprise application programs. The disclosed system enables individual enterprise application programs to define network service parameters on an end to end basis, across multiple forwarding domains within the enterprise network. The disclosed system enforces application specific communication service parameters using software programs, referred to as network services modules (NSMs), operating on a per-forwarding domain basis. A network services protocol (NSP) provides communications between application servers and the NSMs, and a network services exchange protocol (NSEP) is used for communications between the NSMs. The disclosed NSMs enforce application specific quality of service (QoS) levels within forwarding domains as needed to support end to end communication service parameters defined by enterprise applications. NSM operation includes, but is not limited to, control of path selection on a per-forwarding domain basis, as needed to support the communication service definitions of enterprise application programs. Authentication by application servers of application service requests is used to provide network service authentication prior to establishing the requested communication services.

From the perspective of the enterprise application program, the disclosed enterprise network communication services are offered at a network level, across the entire enterprise network, independent from specific internetworking or networking platforms or protocols used within the enterprise network. To achieve network level service guarantees across the enterprise network, individual forwarding domains are required to provide specific services. The specific services provided at the enterprise network level by the disclosed system include, but are not limited to, guaranteed bandwidth, acceptable packet loss, reliability and network delay. Any communication related, network level service may be provided by the disclosed enterprise network service architecture, depending on an enterprise application's specific networking needs.

The disclosed system provides both a mechanism for enterprise applications to request enterprise network services, and a mechanism for the enterprise network to provide the requested services. The disclosed NSP enables an enterprise application to request and monitor one or more services from the enterprise network. Enterprise applications use NSP to request particular services. In one embodiment, an operating system extension is used to support NSP at the application server system. Enterprise application servers accordingly request one or more enterprise network services by executing an operating system call. NSP may be used by enterprise applications that use many disparate existing technologies such as TCP/IP, UDP/IP, RTP, etc., and allows the enterprise network services provided by the disclosed system to be offered at the network layer and transport layer in the OSI model without requiring each existing transport and network level protocol to be extended to provide service options.

In a preferred embodiment, the NSMs maintain a dynamic view of the entire enterprise network, reflecting its operation and performance, and control some or all of the resources within associated portions of the enterprise network. For example, the NSMs may be implemented as a distributed application within the enterprise network, each module controlling service within particular network domain, geographic area or group of devices. Since the enterprise application's packets are still serviced by specific networking devices within the enterprise network, the NSMs control those networking devices within the portion of the enterprise network they are associated with. A network operator can define the degree of control allowed to the NSM over networking devices within the associated portion of the network. The controllable capabilities of a networking device may be communicated to the NSM through a Network Device Capability (NDC) subset of NSEP.

Thus there is disclosed a system that provides independent enterprise application programs a wide range of network related, end to end service guarantees from the enterprise network.

BRIEF DESCRIPTION OF THE DRAWINGS

The invention will be more fully understood by reference to the following detailed description of the invention in conjunction with the drawings, of which.

DETAILED DESCRIPTION OF THE PREFERRED EMBODIMENTS

Figure 1:
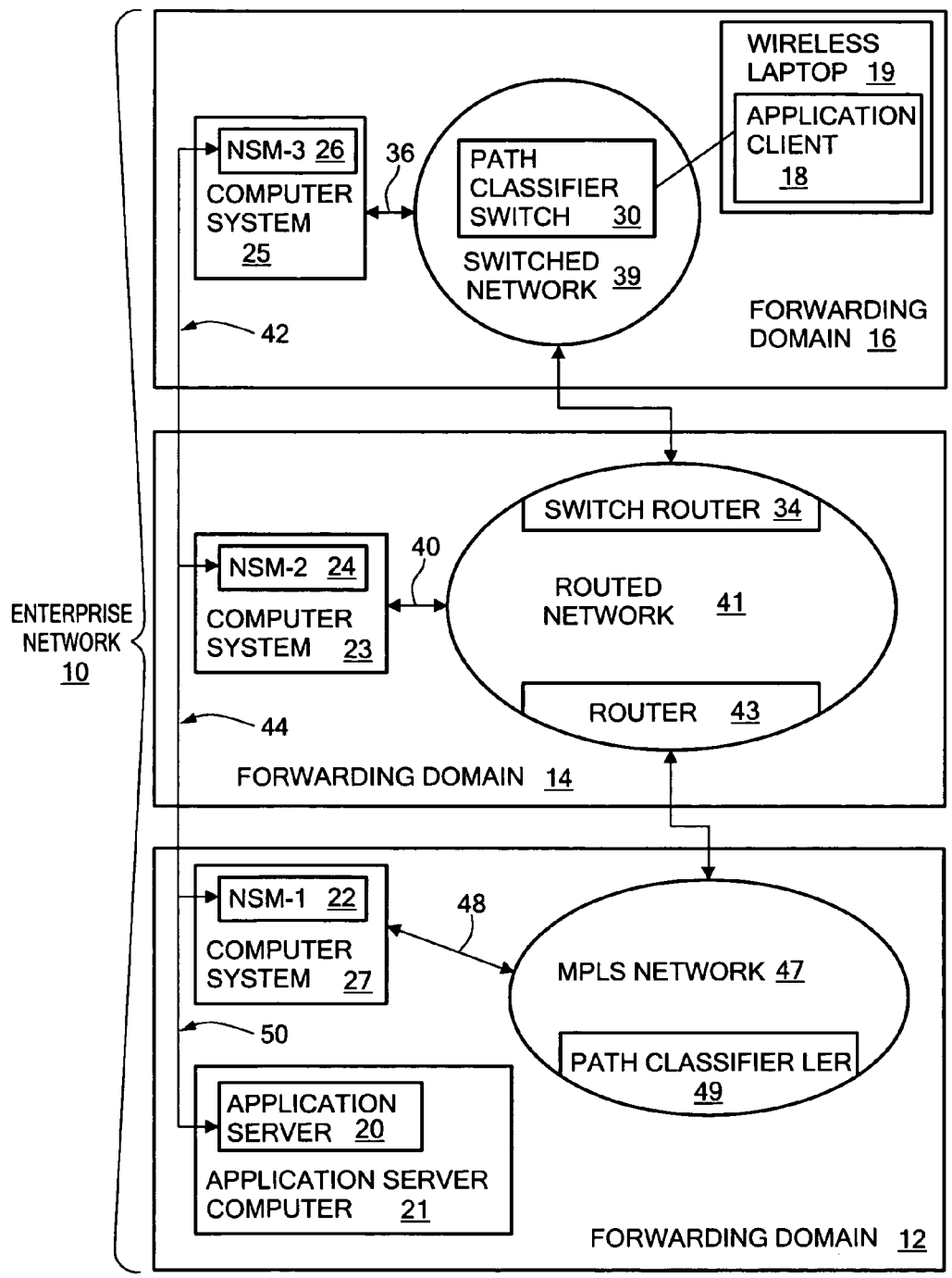
FIG. 1 is a block diagram showing components in an illustrative embodiment of the disclosed system.

As shown in FIG. 1, an illustrative embodiment of the disclosed system operates in an enterprise network 10. The enterprise network 10 includes a first forwarding domain 1 12, a second forwarding domain 2 14, and a third forwarding domain 3 16. In the illustrative embodiment of FIG. 1, an enterprise software application client 18, for example executing on a wireless laptop computer 19 providing a wireless signal to a wireless access device, uses TCP/IP to logically connect to the enterprise software application server 20 across the enterprise network 10, and to request service from the application server 20 over the connection. Upon establishment of this initial logical connection, the application server 20 receives and authenticates the request for service from the application client 18, for example based on credentials provided from the application client 18 to the application server 20 across the enterprise network 10.

If the service request from the application client 18 is authenticated by the application server 20, the application server 20 requests network services on the enterprise network 10. Otherwise, in the event the service request from the application client 18 is not authenticated, and accordingly rejected by the application server 20, the disclosed system cannot be used to provide network services on the enterprise network 10. This results from the fact that the application server 20 is provided the interface for requesting enterprise network services through the disclosed system, as opposed to the application client 18. For example, in the event the service request from the application client 18 is authenticated, the application server 20 may request some amount of guaranteed bandwidth, for example 10 Mbps, to be provided for the logical connection between the application client 18 and the application server 20, across the enterprise network 10. While the enterprise network service parameter is described, for purposes of explanation, as a level of guaranteed bandwidth between the application client 18 and the application server 20, the present invention is not so limited. Any other suitable enterprise network service parameter may be specified in the enterprise network service request from the application server 20, including, but not limited to, network service parameters such as acceptable packet loss, network reliability and/or network delay.

The application server 20 communicates the enterprise network service request to the Network Service Modules NSM-1 22, NSM-2 24, and NSM-3 26. As shown in FIG. 1, each of the forwarding domains 12, 14 and 16 is associated with a corresponding NSM. NSM-1 22 is associated with the forwarding domain 12, NSM-2 24 is associated with forwarding domain 14, and NSM-3 26 is associated with forwarding domain 12.

The application server 20 may be designed to execute on any specific type of computer system having one or more processors, input/output devices, and program storage, and may be designed to execute with any appropriate software operating system. For example, the application server 20 may be designed to execute on a hardware computer system with a modified version of the Windows NT™ operating system, provided by Microsoft Corporation. Such a modified version of the Windows NT operating system implements a communications protocol enabling information describing enterprise network service requests issued by the application server 20 to be passed to one or more NSMs, such as NSM-1 22. This protocol is referred to herein for purposes of explanation as the Network Services Protocol (NSP). Using such a modified operating system, the application server 20 makes an operating system call requesting 10 Mbs guaranteed service for the virtual connection between the application server 20 and the application client 18. The computer system 21 may be provisioned a priori with the IP address of NSM-1 22. The modified Windows NT operating system communicates to NSM-1 22, using NSP, requesting the 10 Mbs guaranteed service. The NSP request message sent to NSM-1 22 includes the requested amount of guaranteed bandwidth, along with identification of the virtual connection between the application server 20 and the application client 18. Such virtual connection identification may include source and destination IP addresses and TCP ports. Alternatively, if the operating system itself is not modified to implement NSP, the application server 20 itself can be designed to implement NSP communications with one or more of the NSMs.

As shown in FIG. 1, forwarding domain 16 includes a switched network 39 including some number of switching packet forwarding devices, forwarding domain 14 includes a routed network 41 including some number of routing packet forwarding devices, and forwarding domain 12 includes an MPLS-based network 47. The switched network 39 has a physical connection 52 with switch router 34, and to a computer system 25 on which NSM-3 26 executes. NSM-3 26 has a logical connection to NSM-2 24, and the computer system 23 on which NSM-2 24 executes has a physical connection 40 into the routed network 41. The router 43 has a physical connection 46 into the MPLS network 47. NSM-2 24 has a logical connection 44 to NSM-1 22. The computer system 27 on which NSM-1 22 executes has a physical connection 48 into the MPLS-based network 47, and NSM-1 22 has a logical connection 50 to the application server 20. The application server computer system 21 has a physical connection to the label edge router 49.

During operation of the embodiment shown in FIG. 1, when the networking devices (Routers, Switches, LER etc.) in each of the forwarding domains 12, 14 and 16 detect the NSM associated with their forwarding domain, for example based on NSM addressing information provisioned into each networking device, they each inform the NSM of their service capabilities. This communication uses a Network Device Capability (NDC) part of the Network Services Exchange Protocol (NSEP). The specific resources within each networking device that can be controlled by the associated NSM can be provisioned by a network administrator.

Each NSM receives and collects resource information provided from the networking devices within its forwarding domain. Each NSM is provisioned with information describing its NSM peers. Each NSM communicates with other NSMs to determine the adjacencies of forwarding domains. NSEP is used to establish adjacencies of forwarding domains.

In the illustrative embodiment of FIG. 1, application server 20 communicates with NSM-1 22, since NSM-1 22 is the NSM for the forwarding domain 12 in which the application server is located. The service request by application server 20 to NSM-1 22 for 10 Mbps guaranteed service on the virtual connection between application server 20 and application client 18 may include source and destination IP addresses and TCP ports to identify the virtual connection, and is communicated using NSP.

In response to the network service request by the application server 20, NSM-1 22 determines a potential flow path that meets the requested service requirement (i.e. 10 Mbps) within forwarding domain 12. NSM-1 22 then determines a next adjacent forwarding domain for packets passed between the application server 20 and the application client 18. In this case, the adjacent forwarding domain is forwarding domain 14. Using a table of forwarding domain adjacencies, NSM-1 22 makes a determination of a next adjacent forwarding domain, and further determines the associated NSM for that adjacent forwarding domain, in this case NSM-2 24. Using NSEP, NSM-1 22 requests NSM-2 24 provide the requested network service with respect to forwarding domain 14.

In response to the request from NSM-1 22, NSM-2 24 determines a potential flow path meeting the requested service requirement within forwarding domain 14. Using its forwarding domain adjacency table, NSM-2 24 finds a next adjacent forwarding domain for packets passed between application server 20 and application client 18. In the example of FIG. 1, the next adjacent forwarding domain is forwarding domain 16. NSM-2 24 also uses its table of forwarding domain adjacencies to determine that forwarding domain 3 16 is controlled by NSM-3 26. Using NSEP, NSM-2 24 requests NSM-3 26 provide the requested network service in forwarding domain 16.

In response to the request from NSM-2 24, NSM-3 26 determines a potential flow path that meets the requested service requirement within forwarding domain 16. NSM-3 26 determines that the end device 19 is within forwarding domain 16. NSM-3 26 informs NSM-2 24 of the probable success of providing the requested service within forwarding domain 16. Each NSM determines the probability of success of providing the requested service within its associated forwarding domain based on the current availability of resources. For example, NSM-2 24 determines the probability of successfully providing the requested service with regard to forwarding domain 14, NSM-1 determines the probability of success of providing the requested service within forwarding domain 12, etc. If any NSM determines that the requested service cannot be, or is not likely to be provided across its associated forwarding domain, it passes this information to the previous adjacent forwarding domain NSM, which passes the information in turn to the previous adjacent forwarding domain, and so on, until the service request is eventually denied to the original service requester (i.e. application server 20). Similarly, if any NSM fails to actually setup the necessary path within its associated forwarding domain, that failure is also reported to the NSM from which the service request was received by that NSM, and passed back to inform the original service requester of the failure.

In the illustrative embodiment of FIG. 1, NSM-1 22 receives an affirmative probability of success from NSM-2 24, which received an affirmative probability of success from NSM-3 26. NSM-1 22 then informs NSM-2 24 to setup the flow path within forwarding domain 14, and NSM-2 24 in turn will inform NSM-3 26 to setup the flow path within forwarding domain 16.

Next, the NSM modules establish the flow paths within the forwarding domains, and connect them together to form the end to end communication path for the virtual connection between the application server 20 and the application client 18. NSM-1 22 creates a label path, using NSEP, beginning at LER 49, which is connected to the application server computer system 21, across the MPLS-based network 47, and to the edge of the routed network 41 in the adjacent forwarding domain 14. In doing so, NSM-1 22 causes a label to be recognized by networking devices within the MPLS-based network 47, for the data packet flow within forwarding domain 12. The label is associated with 10 Mbs guaranteed service in each networking device that the data flow passes through. LER 49, physically connected to the application server system 20, is referred to as a "path classifier" system, because it identifies and labels received packets from the application server 20 that are subject to the previously defined enterprise network service requirements. As a path classifier, LER 49 recognizes, based on information provided by NSM-1 22, source and destination IP address and TCP port values in the packet headers of packets received from the application server 20, that are sent to the application client 18, and which therefore are subject to the end to end service requirements.

A networking device within the MPLS-based network 47 that handles packets to and from the adjacent forwarding domain 14, is designated by NSM-1 22 as the label termination path device. This device operates with respect to the MPLS-based network 47 to write the appropriate destination IP address and DiffServ bits into packets being forwarded from the MPLS-based network 47 to the forwarding domain 14. In this way, such packets contain the appropriate header information when they are passed to the router 43 in the routed network 41 of forwarding domain 14. The values of the destination IP address and DiffServ bits to be written into such packets are communicated by NSM-2 24 to NSM-1 22 during flow setup.

Using NSEP, NSM-2 24 passes forwarding information to each networking device of routed network 41 through which the data flow between application server 20 and application client 18 passes. The forwarding information includes the destination IP address and DiffServ bit values written into packets from the application client 20 by the label termination path device in the MPLS-based network 41. The forwarding information defines the path in the routed network 41 providing the requested service (i.e. guaranteed 10 Mbs service). At a networking device interfacing the routed network 41 and the switched network 39, for example the switch router 34, NSM-2 24 establishes forwarding information at the end of the routed path, causing the switch router 34 to write a predetermined VLAN-tag (Virtual Local Area Network-tag), or stacked VLAN-tag), and priority bits, into the headers of packets communicated between the application server 20 and the application client 18, that are passed from forwarding domain 14 to forwarding domain 16. The VLAN tag value to be used is communicated by NSM-3 26 to NSM-2 24 during flow setup. In the example of FIG. 1, since the application client 18 is within forwarding domain 16, the device (i.e. switch router 34) passing packets from forwarding domain 14 into forwarding domain 16 also writes the destination IP address and port number associated with the application client 18 on the wireless laptop 19 into such packets.

NSM-3 26 establishes forwarding information in each networking device in forwarding domain 16, using NSEP, through which the data flow passes, using the predetermined VLAN tag (or stacked VLAN tag) and priority bits as the key. The flow provides the characteristic of 10 Mbs guaranteed service to the application end point (application client 18). In this way, the disclosed system sets up an end to end path from application server 20 to application client 18 with a 10 Mbs guaranteed service.

The switch 30 that's physically connected to application client 18 is also a "path classifier", because when it receives packets from the application client 18 to the application server 20, it uses forwarding information established by the NSM to recognize certain received packets, having source and destination IP address and TCP port values provided by the NSM in their headers. The switch 30 writes the appropriate VLAN-tag into such packets to start them on their way towards the application server 20. While the above description of flow path creation is from the application server 20 to application client 18, the reverse path is setup in a similar manner. Note that the end to end path from the application client 18 to the application server may be established with different network service characteristics than the path from the server to the client. For example, the application client 18 may need only 1 Mbs guaranteed service to application server 20, but need the above described 10 Mbs from the application server 20. Once the path for the virtual connection between the application client 18 and the application server 20 is set up by the NSMs, the NSMs may operate to monitor path activity, check the performance of the virtual connection within their respective forwarding domains, and perform clean up when the connection is no longer needed.

Figure 2:
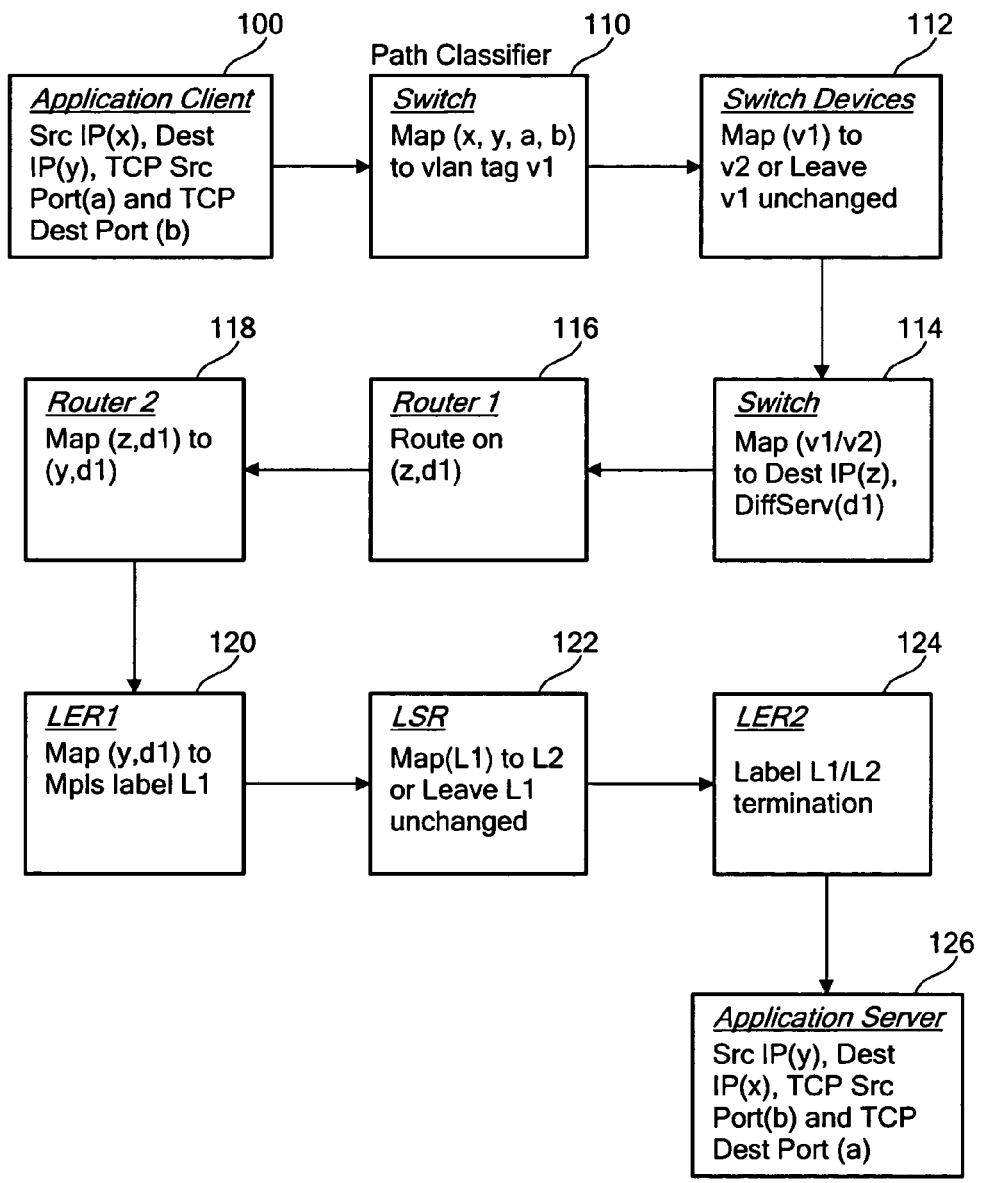
FIG. 2 is a flow chart showing steps performed in an illustrative embodiment of the disclosed system.

FIG. 2 is a flow chart showing steps performed in an illustrative embodiment of the disclosed system during operation, following establishment of an end to end communication path as described above. Networking devices in the enterprise network forward packets and enforce service parameters agreed to for the end to end connection. For example, at step 100, the application client 18 forms and transmits a packet having source IP address 'x', destination IP address 'y', TCP source port 'a', and TCP destination port 'b'. The packet is received by path classifier system 30, which maps the values 'x', 'y', 'a' and 'b' to VLAN tag 'v1', which is written into the packet header. Switch 30 then forwards the packet to other switch devices in forwarding domain 16, which may operate to change 'v1' to another VLAN tag value 'v2', or leave 'v1' unchanged. At the edge of the switch based network 39 in forwarding domain 16, at step 114, the VLAN tag in the packet header (either 'v1' or 'v2') is mapped to a destination IP address 'z' and DiffServ byte value 'd1', which are written into the packet header. The packet is then forwarded to the routed network 41, in which it is routed at step 116 by a first router based on the values 'z' and 'd1'. At a subsequent router, for example the router 43, the values 'z' and 'd1' are mapped to IP address 'y', which is written into the packet. The packet is then forwarded to an LER device at the edge of the MPLS-based network 47 in forwarding domain 12, in which the values 'y' and 'd1' are mapped at step 120 to an MPLS label L1, which is written into the packet header. The packet is then routed at step 122 within the MPLS-based network 47, within which label L1 may or may not be changed to L2. At step 124, an LER device, such as LER 49, operates to terminate the L1 or L2 label, and forwards the packet to the device 21 on which the application server 20 is executing. The application server 20 then receives the packet. As shown at step 126, the application server 20 may operate to reply to the received packet from the application client by generating a reply packet having source IP address 'y', destination IP address 'x', TCP source port 'b', and TCP destination port 'a'.

While the steps of FIG. 2 illustrate steps to communicate a packet from the application client 18 to the application server 20, a reverse path operates similarly from application server 20 to application client 18. Packets are modified in both directions to identify the connection and/or to include end to end service requirement information in the packet along the network path. Networking devices along the path between the end devices process the packets using previously allocated resources to support the requested service. After reception by the path classifier systems, it is desirable that the packets reflect the enterprise network service they are associated with by VLAN-tag information within switched forwarding domains, and/or by modified address and DiffServ bits within routed forwarding domains.

As illustrated in FIGS. 1-2, the disclosed system allows relatively simple packet processing in the data path of networking devices to provide requested end to end network service performance for enterprise applications. Some complexity is included service setup, but this complexity is pushed away from networking devices to the NSMs. The number of NSMs needed for a particular enterprise network may depend on the number of service calls that are generated per second. The disclosed distributed architecture using NSMs accordingly allows good scalability of enterprise network service offerings.

Each NSM can be embodied in a blade within an existing networking device, or within a dedicated hardware platform, or use a third party platform for execution, such as a personal computer running the Windows™ operating system. The networking devices (switches, routers etc.) may operate to run existing connectivity computation algorithms with a new protocol (NSEP), and must have hardware capable of supporting QoS features needed by the enterprise applications. The forwarding path should be flexible enough for path classifier systems to accommodate new applications which require parsing of various fields in the data packets.

An embodiment of the disclosed system that uses completely new protocols (NSP, NSEP) is just one possible approach. Alternatively, an existing protocol may be modified to carry the required information between the NSMs and other devices in the enterprise network. For example, new TLVs (Type Length Values) may be added to RSVP-TE, and used instead of completely new NSP and NSEP protocols. Moreover, control of specific networking devices by the NSMs can be accomplished using SNMP (Simple Network Management Protocol) rather than by introduction of a new protocol.

Figure 3:
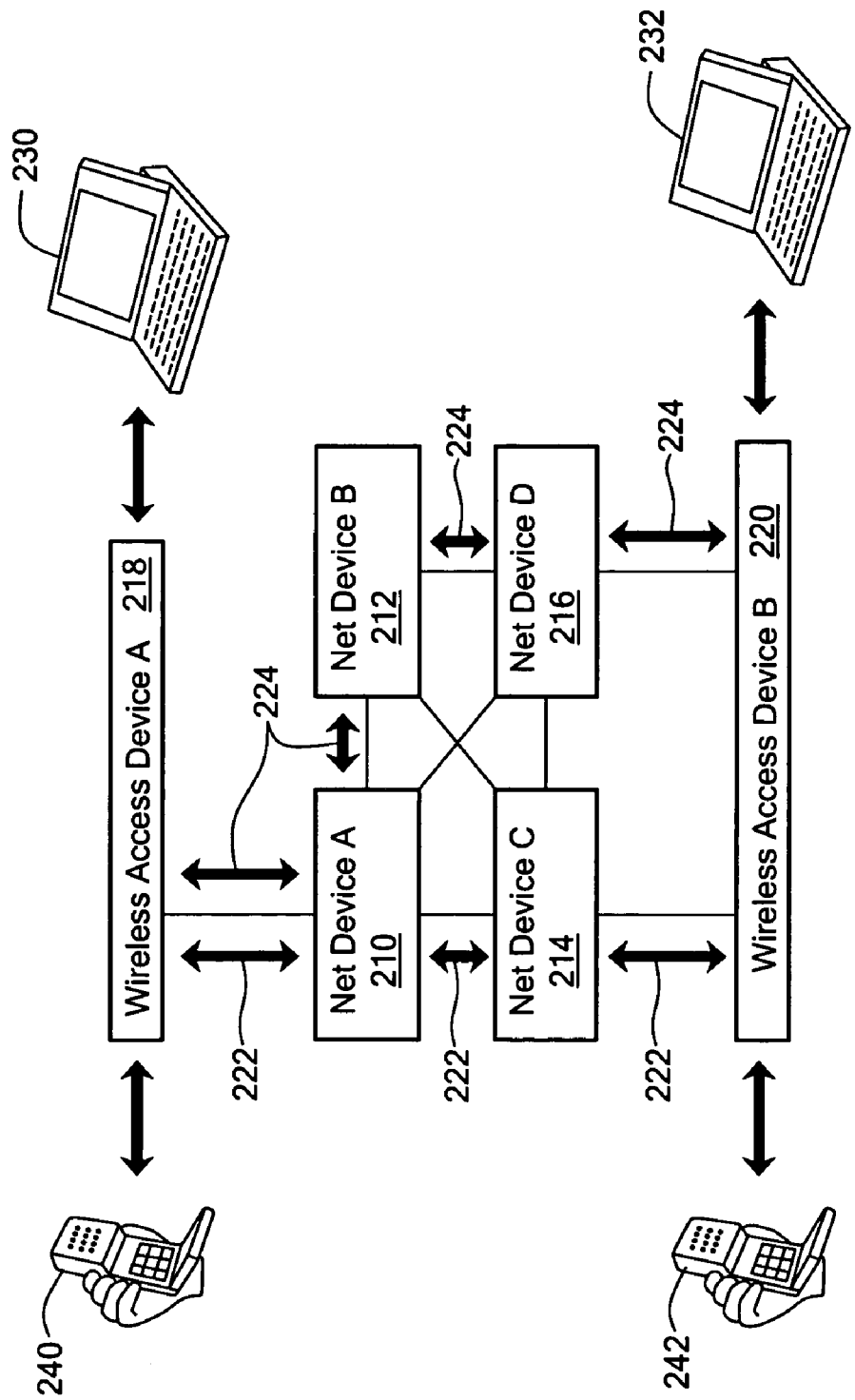
FIG. 3 is a block diagram illustrating operation of the disclosed system in a data network supporting wireless applications.
Figure 4:
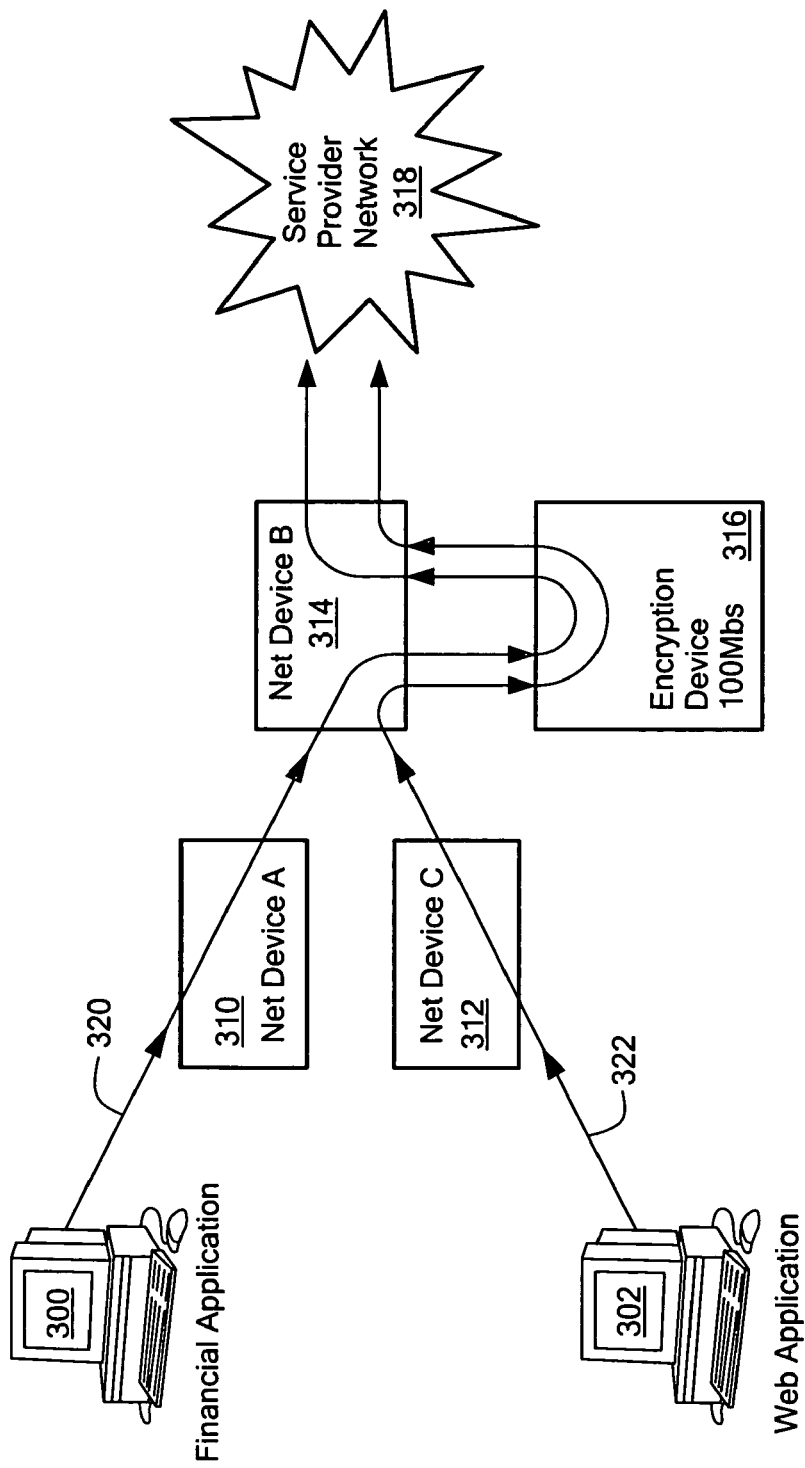
FIG. 4 is a block diagram illustrating operation of a prior art system running a financial application requiring data encryption and a Web application for general information browsing.
Figure 5:
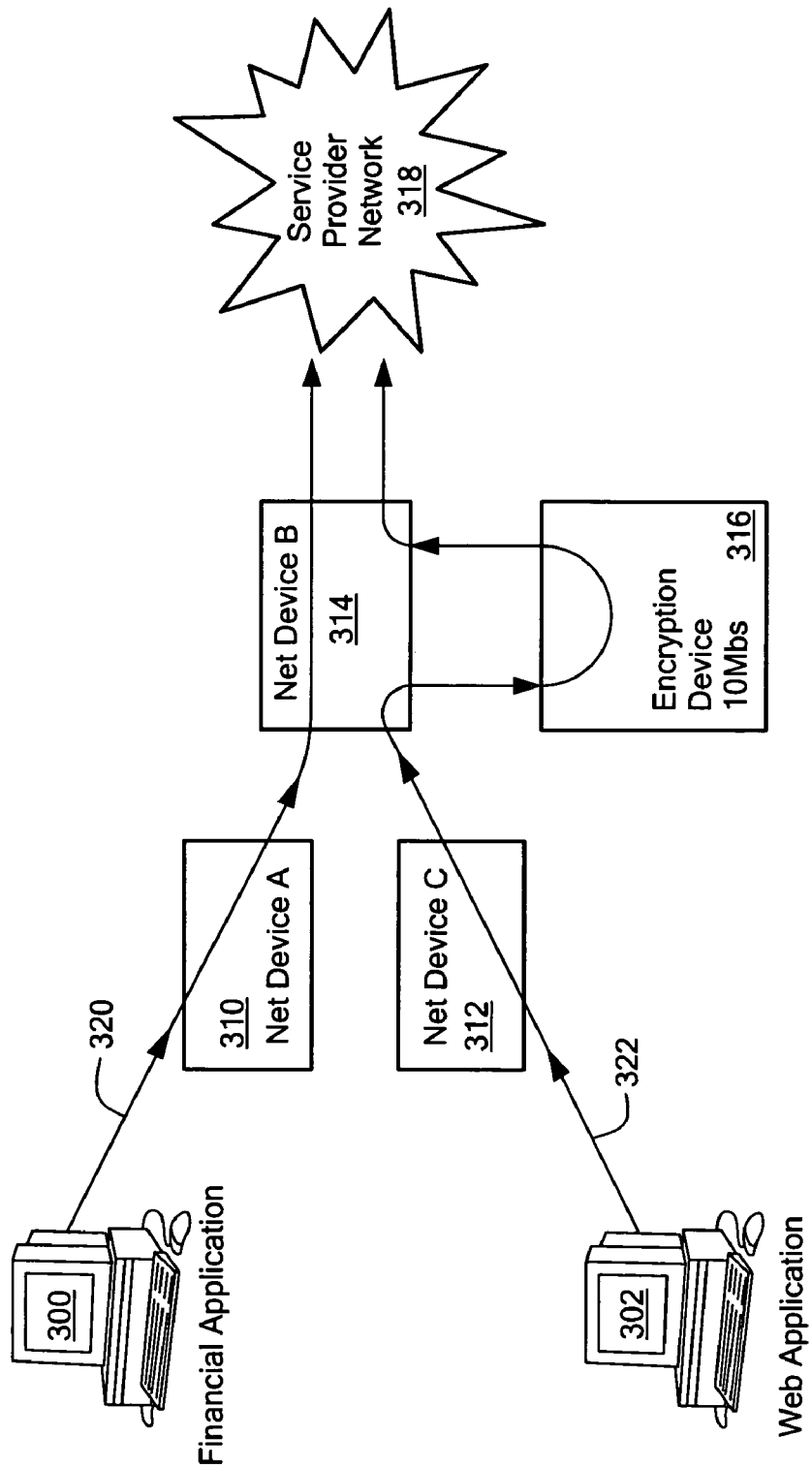
FIG. 5 is a block diagram illustrating operation of the enterprise network shown in FIG. 4 using the disclosed system.

FIGS. 3-5 are application specific examples illustrating operation of the disclosed system. As shown in FIGS. 3-5, determining the specific enterprise network services required for a particular traffic flow, and setting up the associated flow path dynamically to meet those requirements, at the time an application service request is processed, improves the enterprise application's performance, and results in efficient use of networked resources.

FIG. 3 illustrates operation of the disclosed system in an enterprise using its data network to support internal wireless applications in a converged network environment. In the example of FIG. 3, the business enterprise has acquired a data network as its enterprise network, including network device A 210, network device B 212, network device C 214, and network device D 216. The business enterprise uses the data network to support its internal wireless applications. The wireless applications may include both a wireless data application communicating between a first mobile computer 230 and a second mobile computer 232, as well as a wireless voice application communicating between a first wireless phone 240 and a second wireless phone 242. For example, the wireless data application can tolerate a predetermined level of end to end delay, but virtually no packet loss. In contrast, the wireless voice application can tolerate a predetermined level of packet loss but not significant amounts of delay. In the scenario illustrated in FIG. 3, packets are flowing between wireless access device A 218 and wireless access device B 220. However, the network flow path 222 for packets associated with the wireless voice application is different from the network flow path 224 for packets associated with the wireless data application because network device C 214 is congested, but losing packets at a low enough level to support the wireless voice application. Thus, as a result of operation of the disclosed system to configure the paths used by enterprise applications through the enterprise network, the wireless voice application receives the required low delay service, and the wireless data application receives the required loss-free service.

FIG. 4 illustrates operation of a prior art system in an enterprise running a financial application 300 requiring data encryption and a Web application 302 for general information browsing. The enterprise has an enterprise data network including network device A 310, network device B 314, network device C 312, and encryption device 316. A service provider network 318 connects the various sites of the enterprise. The financial application 300 uses a 10 Mbs connection, and the Web application 302 can use up to 90 Mbs. Without the disclosed system, all the data going to service provider's network, including both the data 320 from the financial application 300 and the data 322 from the Web application 302, has to be encrypted by the encryption device 316 to ensure the security of financial application. Accordingly, the encryption device needs to service 100 Mbs. With the disclosed system, as shown in FIG. 5, only the network flow 320 for the financial application 300 goes through the encryption device 316. The encryption device 316 is only required to service 10 Mbs. As a result, the enterprise saves money by efficiently using network resources.

Other enterprise network applications and configurations will also benefit from using the disclosed system. For example, NAS (Network Attached Storage) technology uses the enterprise network between storage devices and servers and/or clients. Problems in enterprise network service in this context include insufficiently reliable communications to storage data, and low network performance because regular data traffic interferes with storage data traffic. Using the disclosed system, the enterprise data network can provide reliable and guaranteed service on connections between servers and storage devices. A server can request a sufficiently reliable, fixed bandwidth connection to a storage device. The disclosed system can dynamically provide a traffic engineered path between the server and storage device, as well as a backup path in case of failure of the primary path.

In many contexts, the disclosed system helps the enterprise network converge voice, data and storage networks by providing appropriate services needed for each application, allowing organizations to better optimize the use of network resources.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for providing network services in an enterprise network, wherein said enterprise network includes a plurality of forwarding domains, comprising:

obtaining at least one end to end network service parameter from an application program;

communicating said at least one end to end network service parameter to a plurality of network service modules, wherein said network service modules are embodied within at least one hardware device including a computer readable memory, each of said network service modules associated with a respective one of said forwarding domains;

determining, by said network service modules, whether said communication paths within each of said forwarding domains can be established to provide said network performance reflecting said at least one end to end network service parameter; and establishing, by said network service modules, communication paths within each of said forwarding domains, said communication paths within each of said forwarding domains together providing an end to end communication path for a single virtual connection across all of said forwarding domains, such that said communication paths within said forwarding domains are each required to provide network performance for communications over said virtual connection reflecting said at least one end to end network service parameter within their respective forwarding domains.

2. The method of claim 1, further comprising:

obtaining a network service request from said application program, wherein said network service request includes said at least one end to end network service parameter; and in the event of a determination by said network service modules that said communication paths within each of said forwarding domains cannot be established to provide said network performance reflecting said at least one end to end network service parameter, denying said network service request from said application program.

3. The method of claim 1, further comprising establishing, by said network service modules, forwarding information enabling data packets to be forwarded between said communication paths within said forwarding domains.

4. The method of claim 1, further comprising:

determining, by each of said network service modules, network service capabilities of networking devices within said respective associated one of said forwarding domains; and wherein said establishing of said communication paths within each of said forwarding domains is responsive to said capabilities of said networking devices.

5. The method of claim 1, further comprising:

determining, by each of said network service modules, network service capabilities of networking devices within said respective associated one of said forwarding domains; and wherein said determining whether said communication paths within each of said forwarding domains can be established to provide said network performance reflecting said at least one end to end network service parameter is responsive to said capabilities of said networking devices.

6. The method of claim 1, further comprising:
receiving, by an application server program associated with said application program, a request for application service by an application client associated with said application program;
authenticating, by said application server program, said request for application service by said application client; and
in the event that said application server program authenticates said request for application service, obtaining a network service request from the application server portion of said application program, wherein said network service request includes said at least one end to end network service parameter.

7. The method of claim 3, further comprising:
maintaining, by each of said network service modules, an adjacency data structure describing adjacency relationships of said forwarding domains in said enterprise network; and
wherein said establishing of said forwarding information enabling data packets to be forwarded between said communication paths within said forwarding domains is responsive to said adjacency relationships.

8. The method of claim 1, wherein said at least one end to end network service parameter comprises an amount of guaranteed bandwidth.

9. The method of claim 1, wherein said at least one end to end network service parameter comprises a level of acceptable packet loss.

10. The method of claim 1, wherein said at least one end to end network service parameter comprises an indication of network reliability.

11. The method of claim 1, wherein said at least one end to end network service parameter comprises an indication of network delay.

12. The method of claim 1, further comprising, subsequent to said establishing of said communication paths within each of said forwarding domains, monitoring network performance of said communication paths within each respective one of said forwarding domains by said associated network service module.

13. A system for providing network services in an enterprise network, wherein said enterprise network includes a plurality of forwarding domains, comprising:
a plurality of network service modules, each of said network service modules associated with a respective one of said forwarding domains, wherein said network service modules are embodied within at least one hardware device including a computer readable memory, and wherein said network service modules are operative to:
obtain at least one end to end network service parameter from an application program;
determine whether said communication paths within each of said forwarding domains can be established to provide said network performance reflecting said at least one end to end network service parameter; and
establish communication paths within each of said forwarding domains, said communication paths within each of said forwarding domains together providing an end to end communication path for a single virtual connection across all of said forwarding domains, such that said communication paths within said forwarding domains are each required to provide network performance for communications over said virtual connection reflecting said at least one end to end network service parameter within their respective forwarding domains.

14. The system of claim 13, further comprising:
a software module operative to obtain a network service request from said application program, wherein said network service request includes said at least one end to end network service parameter; and
wherein said software module operative to obtain said network service request is further operable, in the event of a determination by said network service modules that said communication paths within each of said forwarding domains cannot be established to provide said network performance reflecting said at least one end to end network service parameter, deny said network service request from said application program.

15. The system of claim 13, wherein said network service modules are further operative to establish forwarding information in a plurality of networking devices enabling data packets to be forwarded between said communication paths within said forwarding domains.

16. The system of claim 13, wherein said network service modules are further operative to:
determine, by each of said network service modules, network service capabilities of networking devices within said respective associated one of said forwarding domains; and
wherein said establishment of said communication paths within each of said forwarding domains is responsive to said capabilities of said networking devices.

17. The system of claim 13, wherein said network service modules are further operative to:
determine network service capabilities of networking devices within said respective associated one of said forwarding domains; and
wherein said determination of whether said communication paths within each of said forwarding domains can be established to provide said network performance reflecting said at least one end to end network service parameter is responsive to said capabilities of said networking devices.

18. The system of claim 13, further comprising:
a program module, operative to obtain a network service request from an application server portion of said application program, wherein said network service request includes said at least one end to end network service parameter in the event that said application server program authenticates a request for application service from an application client.

19. The system of claim 14, wherein said network service modules are further operative to:
maintain an adjacency data structure describing adjacency relationships of said forwarding domains in said enterprise network; and
wherein said establishment of said forwarding information enabling data packets to be forwarded between said communication paths within said forwarding domains is responsive to said adjacency relationships.

20. The system of claim 13, wherein said at least one end to end network service parameter comprises an amount of guaranteed bandwidth.

21. The system of claim 13, wherein said at least one end to end network service parameter comprises a level of acceptable packet loss.

22. The system of claim 13, wherein said at least one end to end network service parameter comprises an indication of network reliability.

23. The system of claim 13, wherein said at least one end to end network service parameter comprises an indication of network delay.

24. The system of claim 13, wherein said network service modules are further operative to, subsequent to said establishing of said communication paths within each of said forwarding domains, monitor network performance of said communication paths within each respective one of said forwarding domains.

25. A system for providing network services in an enterprise network, wherein said enterprise network includes a plurality of forwarding domains, comprising:

means for obtaining at least one end to end network service parameter from an application program;

means for communicating said at least one end to end network service parameter to a plurality of network service modules, wherein said network service modules are embodied within at least one hardware device including a computer readable memory, each of said network service modules associated with a respective one of said forwarding domains;

means for determining, by said network service modules, whether said communication paths within each of said forwarding domains can be established to provide said network performance reflecting said at least one end to end network service parameter; and means for establishing, by said network service modules, communication paths within each of said forwarding domains, said communication paths within each of said forwarding domains together providing an end to end communication path for a single virtual connection across all of said forwarding domains, such that said communication paths within said forwarding domains are each required to provide network performance for communications over said virtual connection reflecting said at least one end to end network service parameter within their respective forwarding domains.

* * * * *